May 13, 1947.  O. M. PALMER  2,420,616
MIXING AND MOLDING DEVICE
Filed June 22, 1943
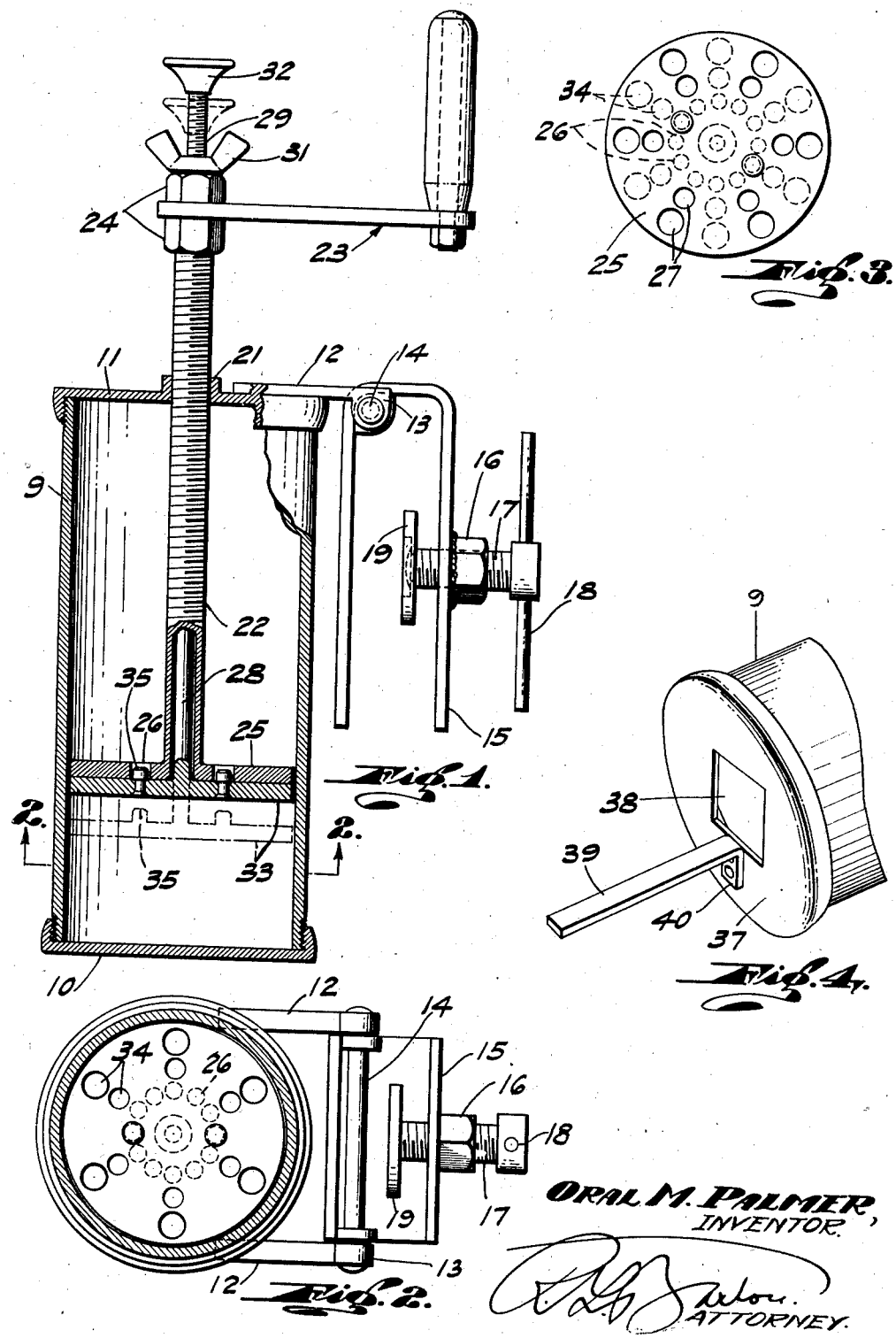
ORAL M. PALMER,
INVENTOR.
ATTORNEY.

Patented May 13, 1947

2,420,616

UNITED STATES PATENT OFFICE 2,420,616

MIXING AND MOLDING DEVICE

Oral M. Palmer, South Gate, Calif.

Application June 22, 1943, Serial No. 491,767

2 Claims. (Cl. 31—36)

This invention relates to a mixing and molding device intended more particularly for mixing together a plurality of pasty or semi-solid substances and for molding the mixed substances into bodies of the desired size after the mixing operation has been completed.

Among the objects of the invention are: to provide an improved, simplified combination in a single device of the mixing and molding means; to provide an improved means for transforming a two-part mixing disk into a disk for extruding the mixed material from the mixing chamber and then restoring said two-part disk to its original condition; and to provide a mixing device which will operate more efficiently upon substances possessing a considerable degree of solidity and, therefore, requiring that the mixing element be applied to them with a considerable degree of force.

Along with numerous other uses the device is particularly well adapted to mixing a coloring element into oleomargarine.

With the foregoing and other objects in view, the invention resides in the novel arrangement and combination of parts and in the details of construction hereinafter described and claimed, it being understood that changes in the precise embodiment of the invention herein disclosed may be made within the scope of that which is claimed without departing from the spirit of the invention.

Referring to the accompanying drawings, which illustrate what is at present deemed to be a preferred embodiment of the invention, Fig. 1 shows the complete device in side elevation, adjusted for mixing, except that the greater portion of the casing and certain parts contained therein are shown in mid-section. In this view some adjustable parts are shown in full lines in one position and in dotted lines in another position.

Fig. 2 is a horizontal section looking up from the line 2—2 of Fig. 1.

Fig. 3 is a bottom plan view of the paired disks shown in section in Fig. 1, but showing said disks in a different rotational relation to each other, wherein the mixing holes of the two disks are out of register with each other, as is required when the device is used to extrudingly mold and measure the mixed substances.

Fig. 4 is a fragmentary perspective view showing the molding and measuring cap attached to the casing in place of the cap shown in the lower portion of Fig. 1.

Referring in detail to the drawings the cylindrical casing 9 is shown, for convenience of illustration, vertically positioned with a cap 10 screwed onto its lower end and a cap 11 screwed onto its upper end, the latter cap being allowed to remain attached during both the mixing and molding operations. Soldered or otherwise secured to each side of the outer face of this cap is a strap metal arm 12 thus providing two parallel arms each of which extends tangentially from the cap and toward the same side of the casing 9. Said arms each have a downwardly offset outer end portion 13 which is apertured to receive an end portion of a hinge pin 14 whereby a clamp yoke 15 is swingably attached to said cap 11. A nut 16 is secured to the outer side of said yoke by soldering or otherwise, and within this nut screws a clamp screw 17 operated by an operating means 18 and carrying a follower or presser foot 19 to operate, for example, against the under surface of a table top or bread board in opposition to the opposite side of the yoke of the clamp.

The cap 11 is centrally provided with a thickened portion 21 having through it a screwthreaded aperture with which cooperates an externally screwthreaded tubular rod 22, said rod carrying at its outer end a crank 23 which is secured thereto by means of a pair of opposed nuts 24 which abut against opposite sides of the crank. The inner end portion of said tubular rod carries, desirably as a unitary part thereof, a disk 25 through which, circumjacent to its center, lead a series of equally spaced apart holes 26, and farther from its center a number of larger holes 27 which are also symmetrically positioned and uniformly spaced apart circumferentially and radially of the disk.

Through the rod 22 loosely extends a longer rod 28 having an outwardly projecting screwthreaded end portion 29 upon which screws a winged nut 31, the extremity of said rod carrying a knob 32. The inner end of said rod 28 carries, desirably integral therewith, a disk 33 having through it a plurality of holes 34 which correspond in number and position to the holes 27 of the disk 25, so that, by circumferentially rotating one disk in relation to the other, these holes of the two disks may be brought into alinement to provide apertures through a follower made up of the two disks when juxtaposed to each other.

The disk 33 is furnished with two diametrically opposite lugs 35 which upstand from the inner face of this disk, said lugs being positioned to enter diametrically opposite holes of the circular series 26 of disk 25, whenever the two disks are in the proper rotational relation to each other. The relative rotational adjustment of these disks is effected by screwing the winged nut 32 outwardly from the position thereof shown in Fig. 1 and then sliding the knobbed shaft 32 downward (or inward) to the position thereof shown in dotted lines, whereupon it may be turned more or less in either direction to bring the lugs 35 into register with other holes of the series 26.

In the particular adjustment of the disks shown in Figs. 1 and 2 the lugs 35 maintain the holes 27 of disk 25 in alinement with the holes 34 of the disk 33, but if the disks were relatively rotated in either direction to bring the lugs into adjacent holes of the series 26, said holes 27 and 34 would be brought out of register, see Fig. 3, so that an imperforate two-part follower disk would result. When the proper rotational adjustment of the disks has been effected the winged nut 31 is screwed down to lock the disks in the adjusted rotational relation to each other. It is not essential that so many of the lug-receiving apertures 26 be provided as is shown in Figs. 2 and 3, but by providing the twelve apertures shown the time required for adjusting the disks is reduced to the minimum.

In Fig. 4 is shown a molding and measuring cap 37 attached to the casing 9, said cap having through its central part a spacious square extrusion aperture 38. Adjacent to one side of this aperture is an arm 39 which is secured to, and projects at a right angle from said cap, said arm being shown furnished with a foot portion 40 whereby it is riveted or otherwise secured to said cap. Said arm is preferably a piece of strap metal disposed with one of its wider faces in the same plane as that edge portion of the aperture 38 adjacent to which the arm is attached, so that the extruded, previously mixed product will slide smoothly out and rest upon the arm. Said arm will be of the proper length to indicate some definite quantity of the extruded material, for example, a quarter of a pound of colored oleomargarine when the outer end of the extruded mass alines with the outer end of the arm.

Preparatory to operating the device after it has been clamped, for example, to a horizontally extending bread board with the casing 9 in an overlying relation thereto, the rod 22 is screwed outwardly until disk 25 is brought into contact with the inner face of cap 11 and then disks 25 and 33 are rotationally adjusted in the manner which has already been described to bring the sets of holes 27 and 34 into alinement with each other, and the winged nut 31 is then screwed down to lock said disks in the adjusted relation to each other. Thereupon the cap 10 is removed from the casing 9 and then after the casing has been swung to an upstanding position wherein the open end thereof is directed upwardly, the materials to be mixed together are filled thereinto, whereupon the cap 10 is reapplied. The operator will now allow the casing to rest horizontally upon the support and by turning the crank in the reverse direction will cause the two-part follower (combined disks 25 and 33) to rotate and simultaneously move from the outer to the inner end of the interior of the casing, during which operation the entire mass of the materials being operated upon will be squeezed through the aforesaid alined openings of the two disks. Then by reversely rotating the crank the required number of turns the entire mass will be forced through the alined openings in the opposite direction.

Owing to the fact that the apertured follower rotates while it moves back and forth it causes the material to take a spiral, tortuous path as it emerges from the mixing openings in numerous small streams. Therefore, much fewer back-and-forth movements are required to perform a thorough mixing operation than would otherwise be necessary; in fact a single back-and-forth movement of the follower is sufficient to mix coloring evenly into oleomargarine.

At the conclusion of the mixing operation the operator, after having brought the two-part follower up against the inner face of the cap 11, will screw the winged nut 31 outwardly to a sufficient extent to allow rod 28 to be operated to move disk 33 away from disk 25 until the outer ends of the lugs 35 clear the adjacent face of said disk 25, thus withdrawing the lugs 35 from the particular apertures 26 which they have been occupying, whereupon the two disks will be rotationally readjusted, to the position shown in Fig. 3, to bring their apertures 27 and 34 out of alinement and will be locked in their readjusted position by projecting said lugs into different holes 26 and then again screwing down winged nut 31. The spreading apart of the two disks to effect this adjustment is illustrated in an exaggerated manner in Fig. 1 by dotted lines. The imperforate cap 10 will next be removed and the apertured cap 37 substituted therefor. Then by rotating the crank in a manner to move the imperforate follower in the extruding direction the mixed mass will be extruded in a square cross section along the arm 34, preparatory to being cut off in the desired lengths, as indicated by said arm. The holes 27 and 34 may be termed "mixing" holes, because the materials are mixed by being forced back and forth through said holes.

Owing to the powerful force which it is possible to apply to the follower by means of the crank and screwthreaded shaft which it operates, the substances being mixed may possess a considerable degree of solidity, and it is unnecessary, even in cool weather, or when recently taken from refrigeration, to warm oleomargarine before mixing the coloring thereinto.

Among various modifications which might be made in the disclosed embodiment of the invention, without exceeding the scope of the claims, might be mentioned the provision in the disks 25 of cut-away portions other than the holes 26 to receive the lugs 35; and also otherwise shaping the extrusion opening 38.

What is claimed is:

1. In a device of the kind described, a tubular casing having a common filling and extruding end, means carried by the end of said casing which is opposite said filling and extruding end whereby it is pivotally attachable to a bread board for swinging between horizontal extruding and upstanding filling positions, a cap attachable to said filling and extruding end of the casing when it is in the upstanding position, said cap having through it an extrusion opening, and means including a follower within said casing to extrude the contents thereof through said opening.

2. A tubular casing having a common filling and extruding end, means carried by the end of said casing which is opposite said filling and extruding end whereby it is pivotally attachable to a bread board for swinging between horizontal extruding and upstanding filling positions, a cap attachable to said filling and extruding end of the casing when it is in the upstanding position, said cap having through it an extrusion opening, means including a follower within said casing to extrude the contents thereof through said opening, and an arm carried by said cap at one edge of said extrusion opening, said arm consisting of a one-piece metal strap disposed with one of its wider faces in the same plane as that edge portion of the extrusion opening adjacent to which said arm is attached but of lesser width than said opening, so that the extruded previously mixed product will slide smoothly out of said extrusion opening with only its midwidth portion resting upon said arm, said arm being of the proper length to indicate a definite quantity of the extruded material when the outer end of the extruded mass alines with the outer end of said arm.

ORAL M. PALMER.

REFERENCES CITED

The following references are of record in the file of this patent:

UNITED STATES PATENTS

| Number    | Name            | Date           |
|-----------|-----------------|----------------|
| 1,998,692 | Van Rossem et al. | Apr. 23, 1935 |
| 1,218,985 | Collister et el. | Mar. 13, 1917 |
| 1,148,451 | Elliott         | Feb. 28, 1939  |
| 1,686,280 | Keller          | Oct. 2, 1928   |
| 1,744,449 | Dawson          | Jan. 21, 1930  |
| 788,843   | Noack           | May 2, 1905    |
| 904,421   | Griffin         | Nov. 17, 1908  |
| 2,324,208 | Hayman et al.   | July 13, 1943  |
| 148,211   | Haven           | Mar. 3, 1874   |
| 1,597,271 | Fleek           | Aug. 24, 1926  |